United States Patent
Philomin et al.

(10) Patent No.: US 7,139,738 B2
(45) Date of Patent: Nov. 21, 2006

(54) FACE RECOGNITION USING EVOLUTIONARY ALGORITHMS

(75) Inventors: Vasanth Philomin, Hopewell Junction, NY (US); Srinivas Gutta, Yorktown Heights, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 746 days.

(21) Appl. No.: 10/183,691

(22) Filed: Jun. 27, 2002

(65) Prior Publication Data
US 2004/0001615 A1    Jan. 1, 2004

(51) Int. Cl.
*G06F 151/18*    (2006.01)
(52) U.S. Cl. .............. 706/14; 706/12; 706/13
(58) Field of Classification Search .......... 706/14, 706/12, 13
See application file for complete search history.

(56) References Cited

U.S. PATENT DOCUMENTS

| | | | |
|---|---|---|---|
| 5,140,530 A * | 8/1992 | Guha et al. | 706/13 |
| 5,940,533 A | 8/1999 | Gentric | |
| 6,260,031 B1 | 7/2001 | Schaffer et al. | |
| 6,311,173 B1 * | 10/2001 | Levin et al. | 706/21 |
| 6,400,996 B1 * | 6/2002 | Hoffberg et al. | 700/83 |
| 6,640,145 B1 * | 10/2003 | Hoffberg et al. | 700/83 |
| 6,892,191 B1 | 5/2005 | Schaffer | |

OTHER PUBLICATIONS

Jun Ohya et al, Detecting Facial Expressions from Face Images Using a Genetic Algorithm, 1996, IEEE, 1015-4651/96, Proceedings of ICPR '96, 649-653.*
Zhao Xin et al, A New Approach to Recover Depth Information by Microscopic Image Processing, 2001, IEEE, 0-7803-7268-9/01, 1189-1193.*
Heung Soo Kim et al, Object-Based Human Face Detection, 2000, IEEE, 0-7803-6301-9/00, 354-355.*
U.S. Appl. No. 09/498,882, filed Feb. 7, 2000, Schaffer.

* cited by examiner

*Primary Examiner*—Joseph P. Hirl

(57) ABSTRACT

A system and method wherein the parameters used for face recognition are determined via an evolutionary algorithm, such as a genetic algorithm. Candidate sets of parameters are evaluated for face recognition performance in a given environment. The most effective sets of parameters are used to generate offspring sets of parameters, and these offspring sets are subsequently evaluated for face recognition performance. This process is repeated, with each generation of offspring sets inheriting attributes of the most successful sets, until the system converges on a set of parameters that exhibits superior performance for the given environment. In like manner, other sets of parameters are determined for other environments. When the face recognition system is deployed, the appropriate set of parameters is used, dependent upon the environment in which the target images originate. In this manner, the system exhibits superior performance in each of the environments in which it is deployed.

18 Claims, 1 Drawing Sheet

FACE RECOGNITION USING EVOLUTIONARY ALGORITHMS

BACKGROUND OF THE INVENTION

1. Field of the Invention

This invention relates to the field of image recognition, and in particular to the use of genetic algorithms to determine which characteristics of an image are preferred for distinguishing among images for efficient and effective recognition and/or to determine a minimum number of different characteristics that are required for efficient and effective recognition.

2. Description of Related Art

Image recognition, and particularly face recognition, is becoming an increasingly popular feature in a variety of applications. Security systems use face recognition to grant or deny access to select individuals, or to sound an alarm when a particular person is recognized, or to continually track an individual as the individual travels amongst a plurality of people, and so on. In like manner, home automation systems are being configured to distinguish among residents of a home, so that the features of the system can be customized for each resident.

Most face recognition systems do not directly compare images to effect a recognition. Instead, each face is characterized using a predefined set of characteristic parameters, such as the ellipticity of the face, the spacing of the eyes, the shape of the chin, etc., and a search for a target face is based on a comparison of these characteristic parameters. These characteristic parameters are designed to facilitate a distinction between images of different faces, and a matching between different images of the same face. In this manner, a target image can be compared to a set of reference images, and, based on the characteristic parameters, the number of possible reference images that match the target image is reduced, preferably to one reference image that corresponds to the same face as in the target image. In a controlled environment, such as an entry vestibule with a security camera, the comparison of a target face to a library of authorized faces is a fairly straightforward process. An image of each of the authorized individuals will have been collected using an appropriate pose in a well lighted area. The person requesting entry to the secured facility will be instructed to stand at a certain point relative to the camera, to most closely match the environment in which the images of the authorized people were collected. Sufficient lighting is provided to facilitate a straightforward comparison process.

For most applications, however, requiring the target individual to pose is an unrealistic restriction. Most home occupants, for example, will not generally be agreeable to standing at a particular point in the home in order for the home automation system to recognize the occupant. Most security systems are designed to be unobtrusive, so as not to impede the normal course of business or travel, and would quickly become unusable if each person traveling to or through an area were required to stop and pose. Thus, in most applications, the target image or images will be obtained under less-than-ideal conditions, and will generally not correspond directly to the pose and orientation of the images in the library of images. In an image tracking system, wherein an image of a target is obtained from one scene, and then matched to images in subsequent scenes, neither the original image nor the subsequent images will be obtained under ideal conditions.

Because one or both of the images being compared for face recognition will generally be less-than-ideal, a rigid comparision of all the characteristic parameters that define each face will not generally be suitable. Some parameters will not be determinable due to the particular orientation of the face relative to the camera, or due to shadows introduced by less-than-ideal lighting conditions, or due to other environmental factors. A more complexing difficulty than the absence of a measure of a characteristic parameter, however, is the presence of a mis-measured characteristic parameter, also caused by capturing the image under less-than-ideal conditions. In a typical comparison of two images, some parameters will match, some parameters will not match, and some parameters will be absent.

Conventional face recognition systems require the ability to reach a match/no-match decision based on incomplete and often conflicting information. Generally, the developers of the system determine the particular parameters that are most instrumental in determining a match, and give these parameters more 'weight' in the match/no-match decision than other parameters. In some systems, combinations of parameters are given more 'weight' than their individual 'weights'. For example, the ellipticity of the face and the spacing of the eyes may each have a certain significance in the match/no-match decision process, and an extra significance may be afforded to an image wherein there is a match of both the ellipticity and eye spacing. These decision rules are generally developed based on the trial-and-error analysis of hundreds of images. Obviously, the effectiveness of these decision rules distinguishes a successful face recognition system from unsuccessful systems, and considerable resources are expended to develop these decision rules.

Among competing face recognition systems, different performance characteristics will emerge. One system may be more successful than its competitors in matching faces in an outdoor environment; another system may be more successful in an indoor environment; and so on. Some systems may be particularly sensitive to camera angles, others may be sensitive to shadows. Although each vendor of a face recognition system would prefer to excel in all areas, the cost of developing rules for each environmental condition precludes the customization of the face recognition system for each potential environment. Also, in most applications, the face recognition system will be deployed in a variety of environments for a single customer. In such a case, the customer will generally select a system with sufficient overall performance, even though alternative systems provide better performance in select environments. That is, a system that provides mediocre indoor and outdoor performance will often be preferable to a system with excellent indoor performance and poor outdoor performance, or a system with poor indoor performance and excellent outdoor performance.

BRIEF SUMMARY OF THE INVENTION

It is an object of this invention to provide a system and method that facilitates the development of decision rules for face recognition systems. It is a further object of the invention to provide a system and method that facilitates the customization of decision rules for face recognition in alternative environments.

These objects and others are achieved by providing a system and method wherein the parameters used for face recognition are determined via an evolutionary algorithm, such as a genetic algorithm. Candidate sets of parameters are evaluated for face recognition performance in a given environment. The most effective sets of parameters are used to generate offspring sets of parameters, and these offspring sets are subsequently evaluated for face recognition performance. This process is repeated, with each generation of offspring sets inheriting attributes of the most successful sets, until the system converges on a set of parameters that exhibits superior performance for the given environment. In like manner, other sets of parameters are determined for other environments. When the face recognition system is deployed, the appropriate set of parameters is employed, dependent upon the environment in which the target images originate. In this manner, the system exhibits superior performance in each of the environments in which it is deployed.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
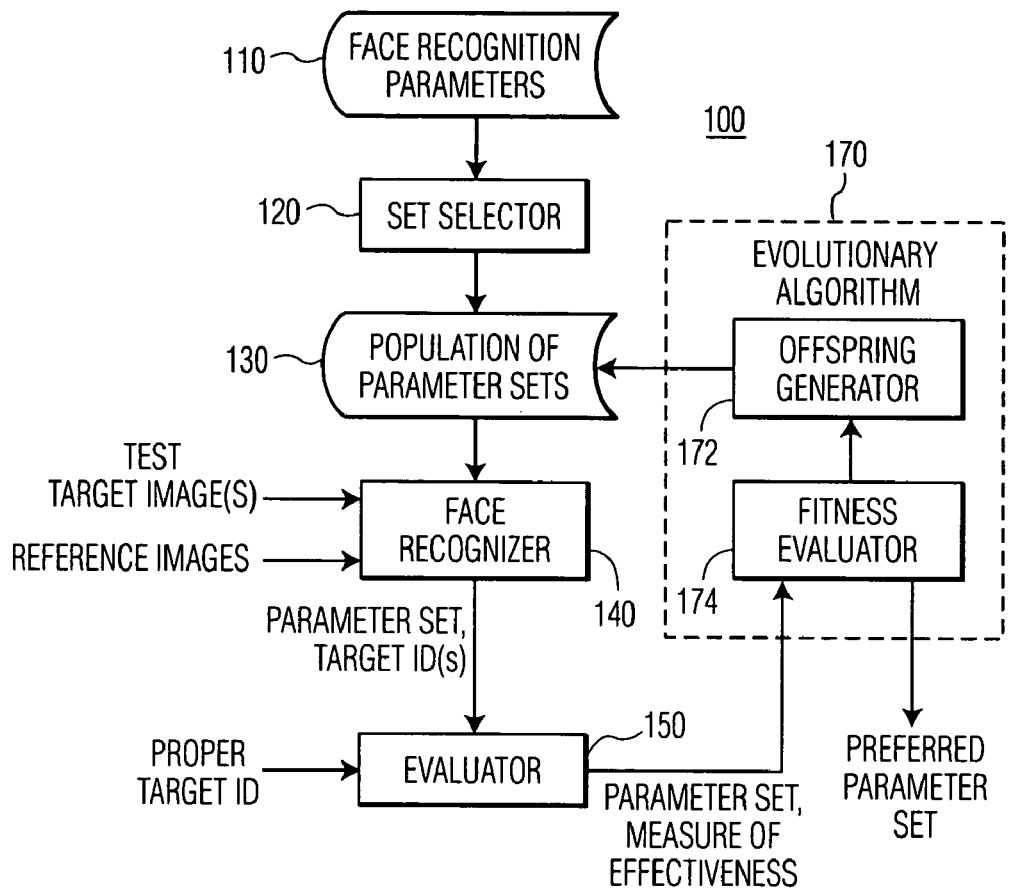
FIG. 1 illustrates an example block diagram of a system for determining a preferred parameter set for face recognition in accordance with this invention.

This invention is premised on the observation that the choice of parameters used to compare face images is highly dependent upon the environment in which the images are obtained. In a typical face characterization process, as many as a hundred different chacterization parameters may be available for characterizing each face. Although a hundred parameters may be available for characterizing a face, the choice of whether to include or exclude each parameter for face recognition will determine the effectiveness of the face recognition system. Some of these parameters may be more helpful than others in distinguishing each face; the measurement of some parameters may be particularly sensitive to environmental factors, and detrimental to a face comparison process when the parameter is mis-determined; some parameters may be particularly beneficial only when one or more other parameters are also available; and so on.

Determining which characterization parameters to use for face recognition in various environments can be a daunting task, based on the number of possible combinations of inclusion/exclusion choices for each parameter, or each subset of parameters.

In accordance with this invention, an evolutionary algorithm is used to determine which parameters to include or exclude for effective face recognition, preferably based on test images that are collected in an environment similar to the environment to which the face recognition system is to be deployed.

Evolutionary algorithms operate via an iterative offspring production process, and include genetic algorithms, mutation algorithms, and the like. In a typical evolutionary algorithm, certain attributes, or genes, are assumed to be related to an ability to perform a given task, different sets of genes resulting in different levels of effectiveness for performing that task. The evolutionary algorithm is particularly effective for problems wherein the relation between the set of attributes and the effectiveness for performing the task does not have a closed form solution. U.S. Pat. No. 6,260, 031, "CODE COMPACTION BY EVOLUTIONARY ALGORITHM", issued 10 Jul. 2001 to J. David Schaffer, Keith E. Mathias, and Larry J. Eshelman, incorporated by reference herein, discloses the use of evolutionary algorithms for compacting software code, data files, and the like. U.S. Pat. No. 5,940,533, "METHOD FOR ANALYZING CURSIVE WRITING", issued 17 Aug. 1999 to Philippe Gentric, incorporated by reference herein, discloses the use of evolutionary algorithms for determining letters and strings from cursive writing. U.S. Pat. No. 5,140,530, "GENETIC ALGORITHM SYNTHESIS OF NEURAL NETWORKS", issued 18 Aug. 1992 to Guha et al., incorporated by reference herein, discloses the use of evolutionary algorithms for determining a preferred architecture for use in a neural network for solving a given task.

The offspring production process of an evolutionary algorithm is used to determine which particular sets of genes are most effective for performing a given task, using a directed trial and error search. A set of genes, or attributes, is termed a chromosome. In the genetic algorithm class of evolutionary algorithms, a reproduction-recombination cycle is used to propagate generations of offspring. In the reproduction phase of the reproduction-recombination cycle, members of a population having different chromosomes mate and generate offspring. These offspring have attributes passed down from the parent members, typically as some random combination of genes from each parent. In a classic genetic algorithm, the individuals that are more effective than others in performing the given task are provided a higher opportunity to mate and generate offspring. That is, the individuals having preferred chromosomes are given a higher opportunity to generate offspring, in the hope that the offspring will inherit whichever genes allowed the parents to perform the given task effectively. The recombination phase of the reproduction-recombination cycle effects the formation of the next generation of parents, based on a preference for those exhibiting effectiveness for performing the given task. In this manner, the number of offspring having attributes that are effective for performing the given task will tend to increase with each generation. Paradigms of other methods of generating offspring, such as asexual reproduction, mutation, and the like, are also used to produce generations of offspring having an increasing likelihood of improved abilities to perform the given task.

In the context of this disclosure, the population consists of members having particular characterization parameters that are used for face recognition. Candidate sets of select characterization parameters are encoded as chromosomes that reflect the inclusion or exclusion of possible characterization parameters. As discussed above, some sets of parameters can be expected to be more effective for distinguishing or comparing faces than other sets. By generating offspring from the members having chromosomes that are more effective for distinguishing or comparing faces than other members, the effectiveness of the offspring for properly recognizing faces is likely to increase.

FIG. 1 illustrates an example block diagram of a system 100 for determining a preferred parameter set for face recognition in accordance with this invention. A data set 110 represents all of the characterization parameters that are available for use in a face recognizer 140. These parameters include such characterizing features as the distance between eyes, width of nose, depth of eye sockets, jaw line, and so on. As discussed above, the inclusion of all possible characterization parameters may not provide effective or efficient face recognition performance, particularly if the face image is obtained under less than ideal circumstances. The object of the system 100 is to determine a preferred set of characterization parameters, based on an evaluation of the performance of different sets of parameters.

In a straightforward embodiment of this invention, a bit-mapping is used to identify the inclusion or exclusion of each parameter in a parameter set. That is, the "chromosome" for the evolutionary algorithm contains as many bits as there are parameters, and the value of each bit identifies whether the corresponding parameter is included or excluded from the parameter set.

A set selector 120 is configured to generate an initial population of parameter sets 130 for evaluation. Any number of techniques can be used to generate these initial sets. In a simple embodiment, a random selection process is used to randomly set bits within each parameter set. In a more directed embodiment, a user may identify the parameters that are conventionally considered to be the most effective, and the aforementioned random process may be biased to favor the inclusion of these parameters. Because, as discussed below, the evolutionary algorithm will continually modify the membership of the population, the choice of an initial population is rather arbitrary, and only affects the time required for the system to converge on a set of parameters that exhibit superior performance. The number of member sets of parameters in the population 130 is also somewhat arbitrary. Generally, a large number of member sets is preferred, to provide a sufficient pool of genes for generating offspring of varying characteristics. Nominally, a population of fifty sets of parameters are sufficient to provide genetic diversity.

Each member set of parameters from the population 130 is evaluated for performance in the face recognizer 140. The example face recognizer 140 is configured to receive a target image and a plurality of reference images, and to produce therefrom a target identifier that identifies which of the reference images the target image most closely matches, using face recognition techniques common in the art. The term "reference image" is used for convenience, because many face recognition systems are configured to determine whether a target face is a member of an authorized set of faces. In a figure tracking system, on the other hand, the "reference images" correspond to any and all face images in a particular scene, and the target image is a face from a prior scene. Also, as discussed above, the actual face recognition is performed based on the characterization parameters of each image, and these parameters may be provided to the face recognizer 140 in lieu of the actual target or reference images.

In a preferred embodiment of this invention, the target image and reference images correspond to the quality of images that are expected to be provided in a specific environment. For example, the images may be collected during a test phase of a face recognition system when it is first deployed, with different sets of images being collected in each of the environments in which the system is deployed. For example, in a single locale system, different sets of images may be collected at different times of the day, as the lighting of the environment changes. In a multiple camera deployment, different sets of images may be collected for each camera at different times of the day. In a single camera system with controlled lighting, only one set of images may be required.

In the test mode, a plurality of test target images are collected, and the proper identification of each target image is determined, for example, by manually identifying each target.

The evaluation of each set of parameters is performed by submitting each of the plurality of test target images to the face recognizer 140, and comparing the target identifier that is produced by the face recognizer for each test target image to the proper target identifier, at the evaluator 150. In a straightforward embodiment, the measure of effectiveness of each evaluated set of parameters is the percentage of correctly identified test target images. Depending upon the expected use of the face recognizer 140, other measures of effectiveness may be used. For example, if the face recognizer 140 is to be used to grant access to secured areas to authorized individuals, and is configured to provide a "no match found" result, the evaluator 150 may be configured to deduct a substantial amount from the measure for each incorrectly identified target image, and to add a smaller amount for each correctly identified target image, and to neither increase nor decrease the measure for a "no match found" result. Other scoring techniques based on the intended application of the recognizer 140 will be evident to one of ordinary skill in the art. In like manner, different scoring techniques may be employed for the different environments in which the recognizer 140 is deployed. For example, different areas of a secured premise may have different security requirements, with different penalties associated with incorrectly identified targets.

After all of the target images for the given environment are applied to the face recognizer 140 for the particular parameter set, the evaluator 150 reports the measure of effectiveness for this parameter set to an evolutionary algorithm 170, and the process is repeated for the next parameter set from the population 130. After all of the parameter sets of the population 130 are evaluated, the evolutionary algorithm 170 will have a measure of effectiveness associated with each parameter set. Based on these measures of effectiveness, the evolutionary algorithm 170 generates a new population of parameter sets 130, using conventional evolutionary algorithm techniques.

Each of the members of the new population is evaluated to provide a corresponding measure of effectiveness, repeating the process detailed above. The evolutionary algorithm 170 is configured to continue to generate new populations 130 until it converges on a preferred set of parameters, or until a time limit is exceeded. As each new population is generated, it is expected that the measure of effectiveness of the members will improve. Convergence is generally defined as a rate of improvement that is below a specified threshold for a given number of generations. When convergence is reached, or the time limit is exceeded, the set of parameters that provided the highest measure of effectiveness is defined as the preferred parameter set for the specified environment.

Optionally, if the highest measure of effectiveness does not reach a specified minimum, the entire process may be repeated, using a different initial population 130, on the assumption that the evolutionary algorithm 170 may have converged to local optimum, and that a higher optimum may be located elsewhere in the solution space. Alternatively, each new population 130 may be configured to contain "mutants", which include randomly generated genes that provide the opportunity for evaluating different regions of the solution space.

Any of a variety of evolutionary algorithm techniques may be employed in the evolutionary algorithm 170. In the example algorithm 170, a fitness evaluator 174 selects members that are used to generate the new members of the population 130 based on their determined measures of effectiveness. The fitness evaluator 174 may also be configured to select members for subsequent population generation based on other criteria as well. For example, the number of included parameters in the set may also be included in the determination of fitness, particularly if the efficiency of the face recognizer 140 is dependent on the number of parameters that are used. Alternatively, the number of included parameters might only be used to break ties between parameter sets that have the same measure of effectiveness.

The highest performing, or best fitness, parameter sets are used to create the new members of the population 130, via an offspring generator 172. In a preferred embodiment, the offspring are generated by a "crossover" combination of pairs of the best fitness parameter sets. Parts of the chromosome of each "parent" in the pair are randomly exchanged to form two new offspring. Because each parent has a chromosome that provides better-than-average performance, there is some likelihood of a crossover chromosome providing better performance than either parent chromosome, when one or more favorable genes of one parent are crossed over to the other, replacing the corresponding unfavorable genes.

The above described evolutionary parameter-set-determination process is performed for each environment that the face recognizer 140 is expected to be deployed, and a preferred characterization parameter set is determined for each of these environments.

Figure 2:
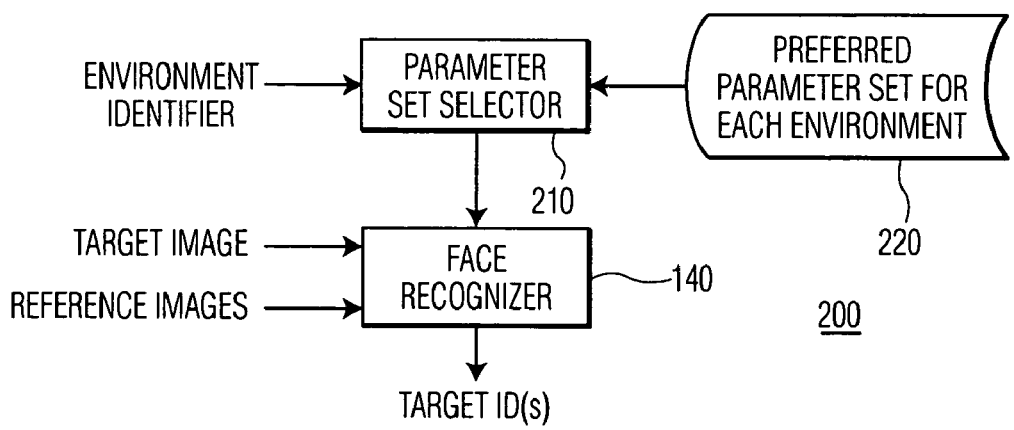
FIG. 2 illustrates an example block diagram of a face recognition system that is configured to use alternative characterization parameter sets, depending upon the particular environment, in accordance with this invention.

FIG. 2 illustrates an example block diagram of a face recognition system 200 that is configured to use alternative characterization parameter sets, depending upon the particular environment, in accordance with this invention.

Each of the preferred parameter sets that is determined via the evolutionary algorithm 170 of FIG. 1 for each environment is available, at 220, for selection by a parameter set selector 210, based on an identification of the environment from which a current target image is obtained. Generally, this identification of the environment is correlated to the current illumination level. That is, for example, each environment may have an associated image of a reference scene, and the identification of the current environment being made by comparing a current image of the reference scene to each of the associated images of the reference scene to find the environment having the most similar illumination to the current image. Alternatively, the environments may be classified as "bright", "medium", and "dark", and a user selects the most appropriate for the current environment. In like manner, the characterization may be related to the time of day, and the seasons of the year, such as "summer, noon", "winter, evening", and so on. In a multi-camera environment, each camera will preferably correspond to one or more environments, such as "camera-1, office-hours", "camera-1, after-hours", "camera-2, office-hours", etc. As will be evident to one of ordinary skill in the art in view of this disclosure, the identification of the environment may take any of a number of forms, the only requirement being that the identification of the environment in the deployed system 200 correspond to the environmental conditions used to determine the preferred parameter set in the evaluation system 100.

The face recognizer 140 of FIG. 2 is the same recognizer 140 that is used to evaluate the parameter sets of FIG. 1. In this application, it is used to identify the current target image, using the parameter set that was determined to be superior for the identified environment.

When a target image from another environment is obtained, the parameter set selector 210 selects the appropriate preferred parameter set for that environment, and provides it to the face recognizer 140. In this manner, the face recognizer 140 is continually provided a preferred set of parameters regardless of a changing environment.

As will be evident to one of ordinary skill in the art, this invention is applicable to any face recognizer 140 that uses a subset of possible characterization parameters, merely by allowing a parameter set selector 210 to provide a preferred set of parameters that identifies the characterization parameters that are included in the subset for a given environment.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the invention is presented in the context of a chromosome that contains an encoding of whether each parameter is included or excluded. Other encoding schemes may also be employed. For example, copending U.S. patent application "MULTI-FEATURE COMBINATION GENERATION AND CLASSIFICATION EFFECTIVENESS EVALUATION USING GENETIC ALGORITHMS", Ser. No. 09/498,882, filed 7 Feb. 2000 for J. David Schaffer, incorporated by reference herein, teaches an encoding scheme wherein particular combinations of parameters are treated as single genes. For example, in a text characterization process, word phrases, such as "green beret", "flying saucer", "red cross", and so on, are encoded independent of the encoding of each word "green", "beret", "flying", "saucer", "red", "cross", and so on, because the significance of such word phrases is substantially higher than the significance of each independent word. That is, for example, a candidate member that recognizes "red cross" may have a, substantially higher performance rating in a text characterization program than a candidate member that recognizes "red" and "cross", because a match with "red" and "cross" will occur in many documents that do not deal with the "red cross". As applied to the invention of this disclosure, a match to a combination of parameters, such as a ratio of select parameters, or sums and/or differences between parameters, and so on, may have a higher face recognition rate than matches to each of the parameters of the group. These and other system configuration and optimization features will be evident to one of ordinary skill in the art in view of this disclosure, and are included within the scope of the following claims.

We claim:

1. A face recognition system, comprising:
   a face recognizer that is configured to identify a face in a target image, based on a set of characterizing parameters, and
   a parameter set selector, operably coupled to the face recognizer, that is configured to select the set of characterizing parameters from among a plurality of sets of characterizing parameters, for use by the face recognizer, based on an identifier of an environment from which the target image is obtained.

2. The face recognition system of claim 1, wherein
   the plurality of sets of characterizing parameters are determined via an evolutionary algorithm applied to a recognition of test target images in a plurality of environments, and
   the environment from which the target image is obtained corresponds to one of the plurality of environments.

3. The face recognition system of claim 1, wherein
   the identifier of the environment corresponds to an identifier of a camera of a plurality of cameras.

4. The face recognition system of claim 1, wherein
   the identifier of the environment includes at least one of:

a time of day, and a measure of illumination.

5. The face recognition system of claim 1, wherein the face in the target image is identified as corresponding to one of a plurality of reference images.

6. A system for determining a preferred set of characterization parameters for face recognition, comprising:

a face recognizer that is configured to provide an identifier of a face in a target image, based on a set of characterization parameters, an evaluator, operably coupled to the face recognizer, that is configured to determine a measure of effectiveness of the set of characterization parameters, based on an accuracy of the identifier, and an evolutionary algorithm, operably coupled to the evaluator, that is configured to provide alternative sets of characterization parameters to the face recognizer for subsequent determinations of measures of effectiveness for these alternative sets of characterization parameters by the evaluator, wherein:

the alternative sets of characterization parameters are based on measures of effectiveness of prior sets of characterization parameters, and the evolutionary algorithm is further configured to identify the preferred set of characterization parameters, based on the measures of effectiveness of each set of characterization parameters of the alternative sets and prior sets of characterization parameters.

7. The system of claim 6, wherein each set of characterization parameters includes a subset of characterization parameters of a plurality of available characterization parameters.

8. The system of claim 7, wherein the measure of effectiveness is further based on a size of the subset of characterization parameters.

9. The system of claim 6, wherein the evolutionary algorithm is configured to provide the alternative sets of characterization parameters by:

determining a fitness of each prior set of the prior sets of characterization parameters, based at least in part on the measures of effectiveness of each prior set, identifying high-performing sets of the prior sets of characterization parameters, based on the fitness of each prior set, generating at least one set of the alternative sets of characterization parameters by combining attributes of two or more high-performing sets.

10. The system of claim 9, wherein the evolutionary algorithm is further configured to generate at least one other set of the alternative sets of characterization parameters via a random process.

11. The system of claim 6, wherein the accuracy of the identifier is based on an identification of one of a plurality of reference images.

12. The system of claim 11, wherein the measure of effectiveness is Increased by a first amount for a correct identification of the one of the plurality of reference images corresponding to the target image, and decreased by a second amount for an incorrect identification, the second amount being larger than the first amount.

13. A method comprising determining a preferred set of characterization parameters for face recognition by:

generating a first population of sets of characterization parameters, evaluating each member set of the first population of sets, to provide a measure of effectiveness of each member set of the first population of sets, based on an accuracy of identifying each face in a plurality of test target images, generating a second population of sets of characterization parameters, based on the measure of effectiveness of each member set of the first population of sets, evaluating each member set of the second population of sets, to provide a measure of effectiveness of each member set of the second population of sets, based on a subsequent accuracy of identifying each face in the plurality of target images, and determining the preferred set of characterization parameters, based at least in part on the measure of effectiveness of each member set of the first and second populations of sets.

14. The method of claim 13, wherein generating the second population of sets includes:

identifying high-performing member sets of the first population of sets, based at least in part on the measure of effectiveness of each member set of the first population of sets, generating at least one member set of the second population of sets by combining attributes of two or more high-performing member sets of the first population of sets.

15. The method of claim 13, further including obtaining a plurality of pluralities of test images, each plurality of test images corresponding to each environment of a plurality of environments, and determining a preferred set of characterization parameters for each environment based on each plurality of test images.

16. The method of claim 13, wherein the accuracy of identifying each face in the plurality of target images is based on an identification of one of a plurality of reference face images as corresponding to the target image.

17. The method of claim 16, further including obtaining a plurality of pluralities of reference images, each plurality of reference images corresponding to each environment of a plurality of environments, and determining a preferred set of characterization parameters for each environment based on each plurality of test images.

18. The method of claim 13, wherein each member set of the first and second populations includes a subset of characterization parameters of a plurality of available characterization parameters.

* * * * *